US012786138B2

(12) United States Patent
Furusawa

(10) Patent No.: US 12,786,138 B2
(45) Date of Patent: Nov. 3, 2026

(54) SYSTEM, CONTROL APPARATUS, CONTROL METHOD, AND COMPUTER-READABLE MEDIUM

(71) Applicant: TOYOTA JIDOSHA KABUSHIKI KAISHA, Toyota (JP)

(72) Inventor: Toru Furusawa, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/501,711

(22) Filed: Nov. 3, 2023

(65) Prior Publication Data

US 2024/0154916 A1 May 9, 2024

(30) Foreign Application Priority Data

Nov. 7, 2022 (JP) ................................ 2022-178064

(51) Int. Cl.
*H04L 47/765* (2022.01)
*H04L 47/722* (2022.01)
*H04L 61/5007* (2022.01)

(52) U.S. Cl.
CPC .......... *H04L 47/765* (2013.01); *H04L 47/722* (2013.01); *H04L 61/5007* (2022.05)

(58) Field of Classification Search
CPC . H04L 47/765; H04L 47/722; H04L 61/5007; H04L 67/1023; H04L 67/1036
See application file for complete search history.

(56) References Cited

U.S. PATENT DOCUMENTS 7,660,896 B1 2/2010 Davis et al.
2015/0288619 A1* 10/2015 Fritsch ................ H04L 67/1008 709/224
2018/0278541 A1 9/2018 Wu et al.
(Continued)

FOREIGN PATENT DOCUMENTS

JP 2018-504038 A 2/2018
JP 2019-041266 A 3/2019
(Continued)

OTHER PUBLICATIONS

Li et al., "Dyncast: Use Dynamic Anycast to Facilitate Service Semantics Embedded in IP address", dated Sep. 2021, pp. 1-8.
(Continued)

*Primary Examiner* — Farzana B Huq
(74) *Attorney, Agent, or Firm* — Finnegan, Henderson, Farabow, Garrett, and Dunner, LLP

(57) ABSTRACT

A system including a plurality of edge systems and a control apparatus, wherein the control apparatus includes: management means for managing IP addresses of services provided by the plurality of edge systems, the management means assigning a same IP address to same services in the plurality of edge systems; deployment means for releasing a service to the plurality of edge systems; selection means for selecting an edge system to be connected to by a client terminal, for each of the services; and transfer control means for, so that the client terminal is able to communicate with the selected edge system when accessing any of the services, controlling a client-side gateway connected to by the client terminal and an edge-side gateway connected to by the selected edge system.

20 Claims, 9 Drawing Sheets

(56) References Cited

U.S. PATENT DOCUMENTS

| | | | |
|---|---|---|---|
| 2019/0260827 | A1 | 8/2019 | Tajima |
| 2020/0296027 | A1* | 9/2020 | Bangalore Krishnamurthy .......... H04L 45/021 |
| 2021/0006972 | A1* | 1/2021 | Guim Bernat ...... H04W 12/041 |
| 2021/0014114 | A1 | 1/2021 | Doshi et al. |
| 2021/0352157 | A1* | 11/2021 | Asati ........................ H04L 65/61 |
| 2022/0022044 | A1* | 1/2022 | D'Oro ................... H04W 48/18 |
| 2022/0206776 | A1 | 6/2022 | Takahashi et al. |
| 2023/0275944 | A1* | 8/2023 | Slater .................... H04L 67/563 709/231 |
| 2024/0073182 | A1* | 2/2024 | Negm ..................... H04L 67/56 |

FOREIGN PATENT DOCUMENTS

| | | | |
|---|---|---|---|
| JP | 2019-144864 | A | 8/2019 |
| JP | 2021-010130 | A | 1/2021 |
| JP | 2022-054417 | A | 4/2022 |

OTHER PUBLICATIONS

Furusawa, Toru et al., "An Investigation of Proximity Edge Cooperative load balancing Method in Edge Infrastructure Using Kubernetes and Service Mesh," Research Report of the Information Processing Society, vol. 2021-CSEC-93, No. 20, vol. 2021-IOT-53, No. 20, 2021, 20 Pages.

* cited by examiner

FIG. 5

50

| SERVICE NAME (51) | CLUSTER IP (52) |
|---|---|
| SERVICE A | xxx.xxx.xxx.11 |
| SERVICE B | xxx.xxx.xxx.12 |
| SERVICE C | xxx.xxx.xxx.13 |
| · · · | · · · |

FIG. 6

60

| SERVICE NAME (61) | CLIENT GW (62) | EDGE GW (63) |
|---|---|---|
| SERVICE A | G3 | G1 |
| | G4 | G2 |
| SERVICE B | · · · | · · · |
| · · · | · · · | · · · |

SYSTEM, CONTROL APPARATUS, CONTROL METHOD, AND COMPUTER-READABLE MEDIUM

CROSS REFERENCE TO THE RELATED APPLICATION

This application claims the benefit of Japanese Patent Application No. 2022-178064, filed on Nov. 7, 2022, which is hereby incorporated by reference herein in its entirety.

BACKGROUND

Technical Field

The present disclosure relates to a system, a control apparatus, a control method, and a computer-readable medium.

Description of the Related Art

It is proposed that, in a system configured of a plurality of edge servers, a relay IP network routes a processing request from a client to a service instance of an appropriate edge server (Patent Literatures 1 to 4, Non-Patent Literature 1).

CITATION LIST

Patent Literature

Patent Literature 1: Japanese Patent Laid-Open No. 2019-41266

Patent Literature 2: Japanese Patent Laid-Open No. 2019-144864

Patent Literature 3: Japanese Patent Laid-Open No. 2021-10130

Patent Literature 4: Japanese Patent Laid-Open No. 2022-54417

Non-Patent Literature

Non-Patent Literature 1: "Dyncast: Use Dynamic Anycast to Facilitate Service Semantics Embedded in IP address" by Li, Yizhou, et al., 2021, IEEE 22nd International Conference on High Performance Switching and Routing (HPSR), IEEE, 2021

SUMMARY

However, in the conventional techniques, such an environment is assumed that services of the edge servers (or common IP addresses given to the services) uniquely and fixedly exist. In an edge cloud environment using Kubernetes or the like, an IP address for accessing a service is independently assigned to each individual edge server (hereinafter also referred to as edge). In order to publish a service to the outside, it is necessary to make gateway settings so that access to a specified port number of a gateway for external connection corresponding to the IP address is transferred to the IP address of the service. When the service is frequently updated, it is difficult to immediately realize switching of a connection destination because it takes much time to make such gateway settings.

A subject of one aspect of the present disclosure is to provide a new method for, in a system in which a plurality of edge systems provide the same service, easily switching an edge system to be connected to by a client terminal.

One aspect of the present disclosure is a system including:

a plurality of edge systems, each of the plurality of edge systems being configured to provide at least one common service; and a control apparatus configured to control the plurality of edge systems; wherein the control apparatus includes:

a management unit configured to manage IP addresses of services provided by the plurality of edge systems, the management unit assigning a same IP address to same services in the plurality of edge systems;

a deployment unit configured to release a service to the plurality of edge systems;

a selection unit configured to select an edge system to be connected to by a client terminal, for each of the services; and a transfer control unit configured to, so that the client terminal is able to communicate with the selected edge system when accessing any of the services, control a client-side gateway connected to by the client terminal and an edge-side gateway connected to by the selected edge system.

Another aspect of the present disclosure is a control apparatus in a system, the system comprising a plurality of edge systems in which a same IP address is assigned to a common service, the control apparatus including:

a selection unit configured to select an edge system to be connected to by a client terminal, for each of the services; and a transfer control unit configured to, so that the client terminal is able to communicate with the selected edge system when accessing any of the services, control a client-side gateway connected to by the client terminal and an edge-side gateway connected to by the selected edge system.

Another aspect of the present disclosure is a control method including:

an address assignment step of assigning a same IP address to same services provided by a plurality of edge systems;

a deployment step of releasing a service to the plurality of edge systems and performing control so that an IP address is assigned to the service;

a selection step of selecting an edge system to be connected to by a client terminal, for each of the services; and a transfer control step of, so that the client terminal is able to communicate with the selected edge system when accessing any of the services, controlling a client-side gateway connected to by the client terminal and an edge-side gateway connected to by the selected edge system.

Another aspect of the present disclosure is a control method for performing control in a system, the system comprising a plurality of edge systems in which a same IP address is assigned to a common service, the method including:

a management step of managing IP addresses of services provided by the plurality of edge systems;

a selection step of selecting an edge system to be connected to by a client terminal, for each of the services; and a transfer control step of, so that the client terminal is able to communicate with the selected edge system when accessing any of the services, controlling a client-side gateway connected to by the client terminal and an edge-side gateway connected to by the selected edge system.

According to the aspects of the present disclosure, automatic switching of a connection-destination edge system linked with update of a service in edge systems becomes possible.

BRIEF DESCRIPTION OF THE DRAWINGS

FIG. 5 illustrates an example of an address management table associating and storing services and cluster IPs;

FIG. 6 illustrates an example of a connection management table storing connection setting for each service;

DESCRIPTION OF THE EMBODIMENTS

Figure 1:
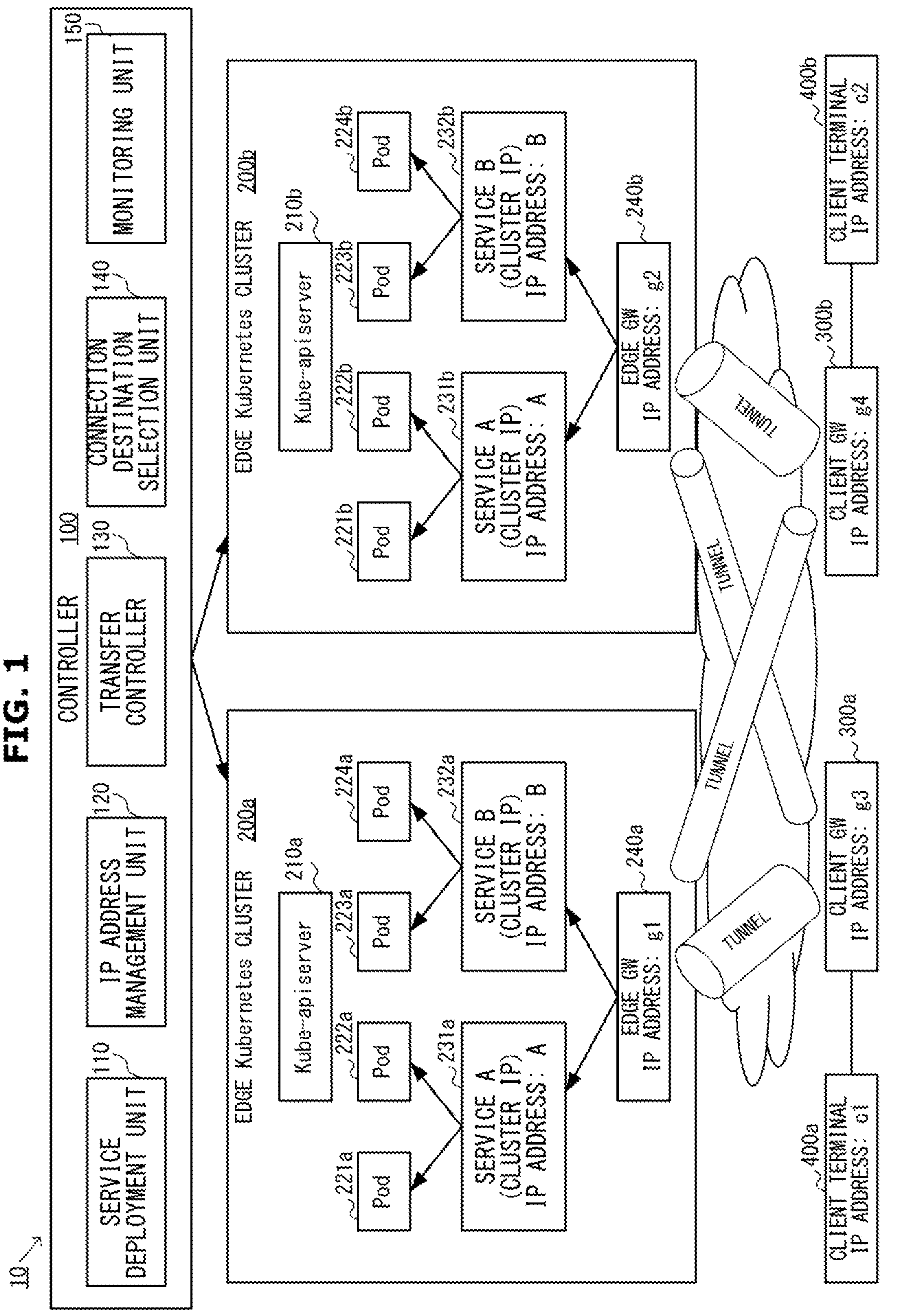
FIG. 1 is a functional configuration diagram of a system according to an embodiment.

Recently, system architecture using container virtualization, which is lightweight virtualization technology, and container orchestration software have been widespread. Such system architecture enables agile and flexible development and operation. Especially, by adopting microservice architecture that provides individual functions as microservices by a container, it is also possible to release a new service many times a day.

An edge server is compatible with lightweight virtualization technology because available resources are limited in comparison with a public cloud. Therefore, it is expected that system architecture using a container and container orchestration software is widely introduced even into edge servers in the future.

In general, container orchestration software randomly assigns an IP address for accessing a service to each edge independently. For example, Kubernetes, which is widely used as a de-facto standard of container orchestration software, randomly assigns a cluster IP address for accessing a service, to each individual Kubernetes cluster (corresponding to an edge). In order to public a service to the outside in such an environment, it is necessary to make settings for a gateway so that access to a specified port number of a gateway for external connection for an IP address is transferred to the cluster IP address.

In such an environment, when update (including generation and deletion) of a service is frequently performed, it becomes difficult to operate a system if it takes much time to make settings for a gateway. Therefore, the present embodiment provides a method capable of automatically and quickly switching a connection-destination service in conjunction with service update in the embodiment described above.

One embodiment of the present disclosure is a system including: a plurality of edge systems, each of the plurality of edge systems being configured to provide at least one common service; and a control apparatus configured to control the plurality of edge systems; wherein the control apparatus includes: a management unit configured to manage IP addresses of services provided by the plurality of edge systems, the management unit assigning a same IP address to same services in the plurality of edge systems; a deployment unit configured to release a service to the plurality of edge systems; a selection unit configured to select an edge system to be connected to by a client terminal, for each of the services; and a transfer control unit configured to, so that the client terminal is able to communicate with the selected edge system when accessing any of the services, control a client-side gateway connected to by the client terminal and an edge-side gateway connected to by the selected edge system.

According to the present embodiment, in the plurality of edge systems, the same IP address is assigned to the same services. Therefore, it is possible to, by changing settings for a client-side gateway and an edge-side gateway by the transfer control unit, enable a client terminal to communicate with a selected edge system at the time of accessing a service. Thus, according to the present embodiment, it is possible to easily switch an edge system to be connected to by a client terminal.

In the present embodiment, each of the edge systems may provide a service, for example, by executing a containerized application or by other methods. Furthermore, each of the edge systems may be a cluster system configured by a plurality of computers combined to operate as a single system or may be a system configured of a single computer. An example of the edge system is an edge Kubernetes cluster configured of a plurality of computers and managed by container orchestration software like Kubernetes.

The management unit in the present embodiment assigns the same IP address to the same services provided by the plurality of edge systems. A method for deciding the assigned IP address is not especially limited. A typical method is to select any of vacant addresses within a particular address range, but the present disclosure is not limited thereto. The management unit stores an IP address assigned to each service.

As an example, the deployment unit in the present embodiment transmits a service generation request including a service to be deployed, and an IP address assigned to the service, to the edge systems. The edge systems perform control to deploy the service and assign the IP address to the service, in response to the service generation request.

The selection unit in the present embodiment selects an edge system to be connected to by a client terminal, for each IP address or service. The selection can be performed based on loads or vacant resources of the plurality of edge systems. The loads or vacant resources of the plurality of edge systems can be acquired, for example, by a monitoring unit. As an example of the load, the number of requests per unit time, the number of requested CPUs or CPU time, or a requested amount of memory is given. As an example of the vacant resources, a value obtained by subtracting the actual number of requests per unit time from the number of requests that can be stably processed per unit time, the available number of CPUs or available CPU time, or an available amount of memory is given. Selection of an edge system can be performed, for example, in a manner that an edge system with a low load or with many vacant resources is preferentially selected. Here, to be "preferentially selected" means that, if other conditions are the same, an edge system with a lower load or with more vacant resources is selected. The selection may be performed further based on an index other than the above. In that case, an edge system with a higher load or with fewer resources may be selected due to influence of the other index. As an example of the other index, a physical distance or communication delay time between gateways is given. By selecting an edge system to be connected to as described above, appropriate load distribution becomes possible.

In the present embodiment, monitoring by the monitoring unit may be performed continually, that is, periodically, or may be performed each time a service is released by the deployment unit. Further, selection of an edge system to be connected to, by the selection unit may be performed each time a result of monitoring by the monitoring unit is obtained; and control by the transfer control unit may be further performed if the edge system to be connected to should be changed in the selection. It can be judged that an edge system to be connected to should be changed, for example, based on the edge system selected as an edge system to be connected to by a client terminal being overloaded, that is, the load being above a threshold, or the number of vacant resources being below a threshold. By performing monitoring and changing of a connection destination as above, it is possible to quickly change a connection-destination edge system each time a load situation in the edge system changes, and prevent performance deterioration and processing stop in the edge system.

For example, by setting tunnel connection between a client-side gateway connected to by a client terminal and an edge-side gateway connected to by a selected edge system, the transfer control unit in the present embodiment may connect the gateways. As an example of other methods, it can be exemplified to change routing settings for a client-side gateway, an edge-side gateway, and a router for an IP network connecting the gateways.

The management unit, the deployment unit, the selection unit, and the transfer control unit of the control apparatus in the present embodiment may be provided as different devices or by different administrators. As an example, the control apparatus may be configured to be provided with the selection unit and the transfer control unit. For example, a control apparatus according to one embodiment of the present disclosure is a control apparatus that, in a system including a plurality of edge systems each of which provides at least one common service, to which the same IP address is assigned, controls the plurality of edge systems, the control apparatus including: a selection unit configured to select an edge system to be connected to by a client terminal, for each of the services; and a transfer control unit configured to, so that the client terminal is able to communicate with the selected edge system when accessing any of the services, control a client-side gateway connected to by the client terminal and an edge-side gateway connected to by the selected edge system.

Further, one embodiment of the present disclosure includes a control method performed by the above control apparatus, a program for causing a computer to execute the control method, and a computer-readable medium storing the program.

Embodiments of the present disclosure will be described below based on drawings. The embodiments below are exemplifications, and the present disclosure is not limited to the configurations of the embodiments.

First Embodiment (System Configuration)

FIG. 1 is a functional configuration diagram of a system 10 according to a first embodiment. As illustrated in FIG. 1, the system 10 is configured including a controller 100 and a plurality of edge Kubernetes clusters 200*a* and 200*b*. An edge Kubernetes cluster is an aggregate of nodes (computers) that execute containerized applications, and provides a plurality of services. Client terminals 400*a* and 400*b* access the services via client gateways 300*a* and 300*b*, and edge gateways 240*a* and 240*b*. The controller 100 is connected to each of the edge Kubernetes clusters 200*a* and 200*b* and manages the edge Kubernetes clusters 200*a* and 200*b*.

In the description below, in the case of mentioning a plurality of similar components, subscripts will be omitted. For example, when it is not necessary to distinguish the edge Kubernetes clusters 200*a* and 200*b*, they will be expressed simply as edge Kubernetes clusters 200.

(Controller)

Figure 2:
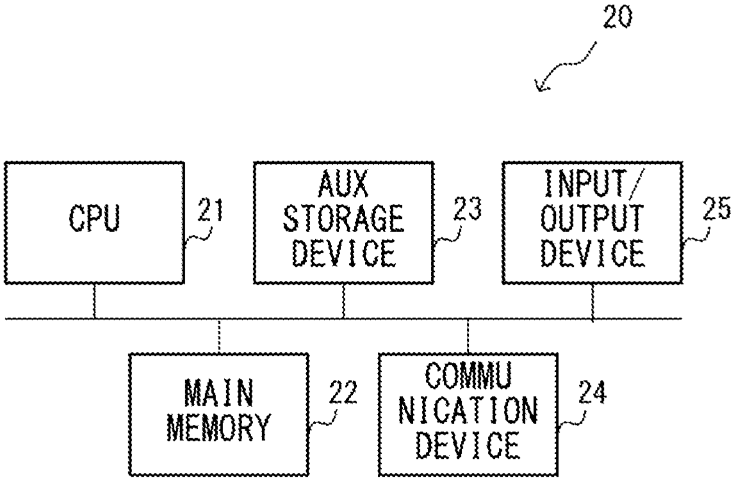
FIG. 2 is a hardware configuration diagram of the system according to the embodiment.

The controller 100 has a function of managing the edge Kubernetes clusters 200*a* and 200*b*, especially deployment of services and network control among the clusters. As illustrated in FIG. 1, the controller 100 has a service deployment unit 110, an IP address management unit 120, a transfer controller 130, a connection destination selection unit 140, and a monitoring unit 150. FIG. 2 is a hardware configuration diagram of a computer (an information processing apparatus) 20 that executes the controller 100. The computer 20 is configured by a CPU 21, a main memory such as a RAM, an auxiliary storage device 23 such as an SSD or an HDD, a communication device 24, and an input/output device 25 being connected to a bus. By the CPU 21 loading a computer program stored in the auxiliary storage device 23 to the main memory 22 and executing the computer program, each of the functional units of the controller 100 described above is realized. The controller 100 may be realized by a plurality of computers or may be realized by a computer (a node) constituting an edge Kubernetes cluster described later.

In response to a request from an edge service developer or operator, the service deployment unit 110 simultaneously releases specified services 231 and 232 to all the edge Kubernetes clusters 200. The IP address management unit 120 centrally manages a cluster IP (an IP address) assigned to each service. The transfer controller 130 sets tunnel connection (for example, LISP (Locator/Identity Separation Protocol) between a client gateway 300 connected to by a client terminal 400 and a gateway 240 of an edge Kubernetes cluster selected by the connection destination selection unit 140. The monitoring unit 150 monitors load information about each edge Kubernetes cluster 200. Details of the above functional units will be described later.

(Edge Kubernetes Cluster)

The edge Kubernetes cluster (hereinafter also referred to simply as the edge cluster) 200*a* is an aggregate of nodes that execute containerized applications. Since the configuration of each node (computer) constituting the edge cluster 200*a* is similar to that of the computer 20 illustrated in FIG. 2, description thereof will be omitted. The edge cluster 200*a* is configured of one or more master nodes and a plurality of worker nodes, and has a kube-apiserver 210*a*, a plurality of pods 221*a* to 224*a*, a plurality of services 231*a* and 232*a*, and an edge gateway 240*a*.

The kube-apiserver 210*a* is an API server that manages resources of the edge cluster 200*a* and is executed by the master node. The pods 221*a* to 224*a* are a set of one or more containers deployed in one node. The services 231*a* and 232*a* are logical entities that publish applications that are being executed by one or more pods, to the outside as network services. Cluster IPs (IP addresses) are assigned to the services 231*a* and 232*a*. The edge gateway 240*a* is a gateway router for the edge cluster 200*a* to connect to an external IP network (for example, the Internet).

Since the configuration of the edge Kubernetes cluster 200*b* is similar to that of the edge Kubernetes cluster 200*a*, duplicated explanation will be omitted. Though it is assumed that services provided by the edge Kubernetes clusters 200*a* and 200*b* are completely common in the present embodiment, provided services are not necessarily completely the same if at least one common service is provided by the edge Kubernetes clusters 200*a* and 200*b*.

The client gateways 300*a* and 300*b* are gateway routers for the client terminals to connect to an external IP network. In a case where the external IP network is a cellular network, the client gateways 300*a* and 300*b* are arranged adjacent to eNodeB/gNodeB.

The client terminals 400*a* and 400*b* are computers that access the services provided by the edge clusters. As an example, the client terminals 400*a* and 400*b* are onboard terminals. For example, an onboard terminal transmits various kinds of sensor data acquired during travel, to an edge cluster. By the edge cluster located between the client terminal and a cloud processing the data, low latency response and reduction in relay traffic are realized.

(Process at Time of Releasing Service)

Figure 3:
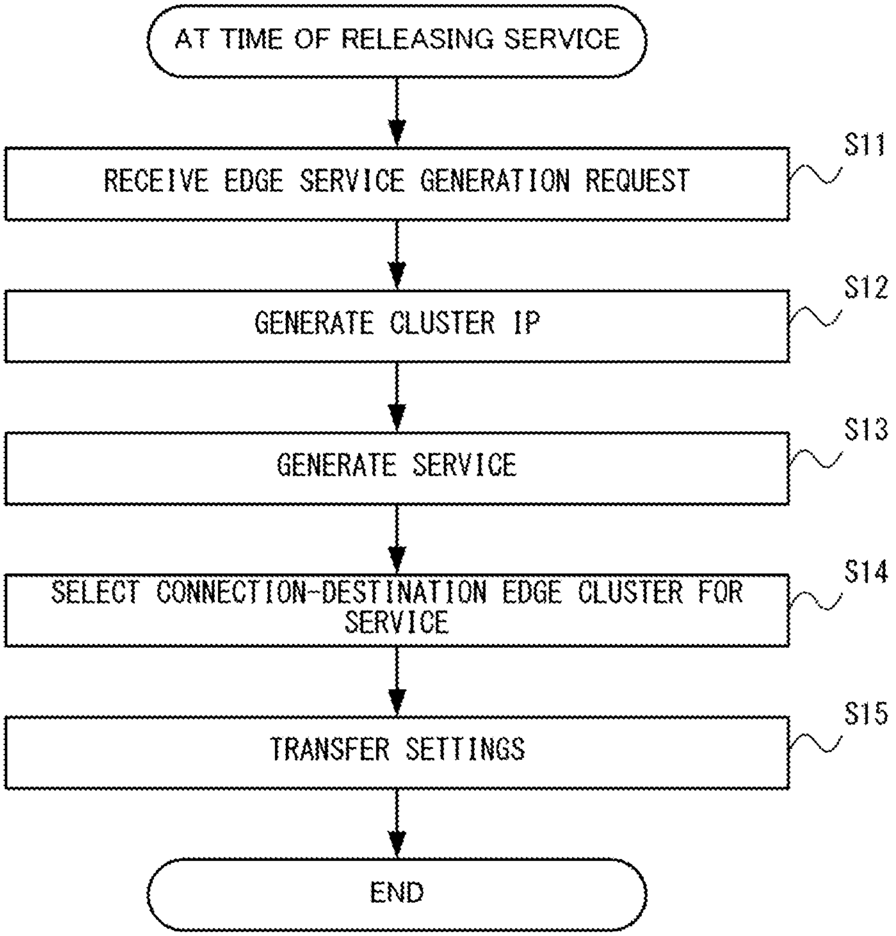
FIG. 3 is a flowchart of a process performed by a controller at the time of releasing a service.
Figure 4:
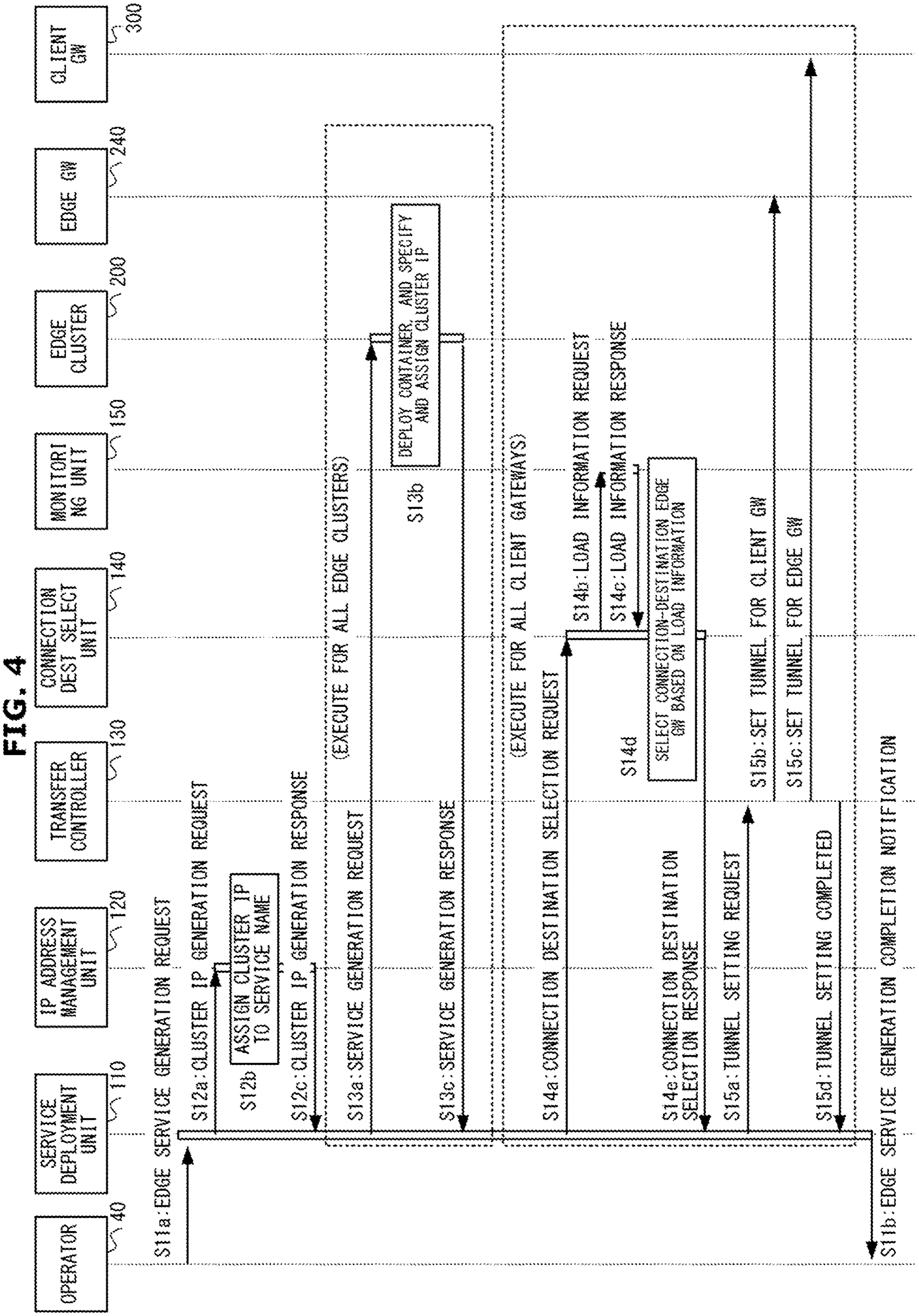
FIG. 4 is a sequence diagram of a process performed at the time of releasing a service in a first embodiment.

A process performed in the system 10 according to the present embodiment at the time of releasing a service will be described below. FIGS. 3 and 4 are a flowchart and a sequence diagram, each of which illustrates a flow of the process at the time of releasing a service. Though description will be made on the case of generating a service here, the same goes for the case of updating or deleting a service. Process numbers of FIG. 3 correspond to process numbers of FIG. 4. In FIG. 4, subscripts such as a and b are attached to process numbers of processes corresponding to processes of FIG. 3 in order to indicate that the processes are elements of the processes illustrated in FIG. 3.

At step S11 (S11*a*), the service deployment unit 110 receives an edge service generation request from an operator 40. The edge service generation request includes a service name and a container image. The edge service generation request may include a storage location of the container image instead of the container image itself.

At step S12, the controller 100 generates a cluster IP for the service. More specifically, the process of step S12 includes the following process. At step S12*a*, the service deployment unit 110 notifies the IP address management unit 120 of a cluster IP generation request including the service name. The IP address management unit 120 assigns a cluster IP to the service name. A typical assignment method is to select any of vacant addresses within an address range specified in advance. At step S12*c*, the IP address management unit 120 notifies the service deployment unit 110 of a cluster IP generation response including the generated cluster IP. The IP address management unit 120 creates or updates an address management table 50 illustrated in FIG. 5 and stores the address management table 50 into a memory. The address management table 50 holds correspondence relationships between service names 51 and cluster IPs 52.

At step S13, the controller 100 generates the service. More specifically, the process of step S13 includes the following process. At step S13*a*, the service deployment unit 110 notifies each of the edge Kubernetes clusters 200 (200*a* and 200*b*) of a service generation request. The service generation request includes the service name, the container image, and the cluster IP. At step S13*b*, each of the edge clusters 200 (the kube-apiserver 210) deploys a container in the cluster, and specifies and assigns the specified cluster IP. At step S13*c*, each edge cluster 200 notifies the service deployment unit 110 of a service generation response. The processes of steps S13*a* to 513*c* are executed for all the edge clusters 200 included in the system 10.

Processes of steps S14 and S15 below are executed for all the client gateways 300 included in the system 10. In the description below, a client gateway 300 selected as a processing target will be referred to as a "target client gateway".

At step S14, the controller 100 selects a connection-destination edge cluster for the service. More specifically, the process of step S14 includes the following process. At step S14*a*, the service deployment unit 110 notifies the connection destination selection unit 140 of a connection destination selection request including the cluster IP of the service and (the IP address of) a target client gateway 300. At step S14*b*, the connection destination selection unit 140 notifies the monitoring unit 150 of a load information request. At step S14*c*, the connection destination selection unit 140 acquires load information about each edge cluster 200 and notifies the connection destination selection unit 140 of the load information as a load information response. The load information about each edge cluster 200 may be a load on the edge cluster 200 or vacant resources of the edge cluster 200. As an example of the load, the number of requests per unit time, the number of requested CPUs or CPU time, or a requested amount of memory is given. As an example of the vacant resources, a value obtained by subtracting the actual number of requests per unit time from the number of requests that can be stably processed per unit time, the available number of CPUs or available CPU time, or an available amount of memory is given. At step S14*d*, the connection destination selection unit 140 selects a connection-destination edge cluster for the service, based on the obtained load information. Selection of an edge cluster can be performed, for example, in a manner that an edge cluster with a low load or with many vacant resources is preferentially selected. Here, to be "preferentially selected" means that, if other conditions are the same, an edge cluster with a lower load or with more vacant resources is selected. The selection may be performed further based on an index other than the above. In that case, an edge cluster with a higher load or with fewer resources may be selected due to influence of the other index. As an example of the other index, a physical distance or communication delay time between gateways is given. By selecting an edge cluster to be connected to as described above, appropriate load distribution becomes possible. At step S14*e*, the connection destination selection unit 140 notifies the service deployment unit 110 of a connection destination selection response including the IP address of the edge gateway 240 of the selected edge cluster 200.

At step S15, the controller 100 makes settings so that access to the service is transferred from the target client gateway to the edge gateway 240 of the selected edge cluster 200. In the present embodiment, the controller 100 sets tunnel connection between the gateways. More specifically, the process of step S15 includes the following process. At step S15*a*, the service deployment unit 110 notifies the transfer controller 130 of a tunnel setting request including the gateway 240 of the selected edge cluster 200, the target client gateway 300, and the cluster IP. At step S15*b*, the transfer controller 130 notifies the selected edge gateway 240 of the target client gateway 300 and the cluster IP to request setting of a tunnel for the target client gateway. In response thereto, the edge gateway 240 makes settings to create tunnel connection to the target client gateway 300 for communication using the cluster IP. At step S15*c*, the transfer controller 130 notifies the target client gateway 300 of the selected edge gateway 240 and the cluster IP to request setting of a tunnel for the selected edge gateway. In response thereto, the client gateway 300 makes settings to create tunnel connection to the selected edge gateway 240 for communication using the cluster IP. By these processes, setting of tunnel connection between the target client gateway 300 and the selected edge gateway 240 is completed.

The service deployment unit 110 stores information indicating between which client gateway 300 and which edge gateway 240 tunnel connection has been set, into a connection management table 60 illustrated in FIG. 6. The connection management table 60 stores correspondence relationships among service names 61, client gateways 62, and edge gateways 63. In the example of FIG. 6, for "Service A", tunnel connection is set between a client gateways "G3" and an edge gateway "G1", and between a client gateways "G4" and an edge gateway "G2". In this example, access to "Service A" via the client gateway "G3" is transferred to the edge gateway "G1" (that is, an edge system having the edge gateway). Further, access to "Service A" via the client gateway "G4" is transferred to the edge gateway "G2" (that is, an edge system having the edge gateway).

When the processes of steps S14 and S15 are completed for all the client gateways, the service deployment unit 110 notifies the operator 40 that generation of an edge service has been completed (step S11*b*). Thus, releasing of the service and initial settings for a tunnel between gateways have been completed.

(Process after Releasing Service)

Figure 7:
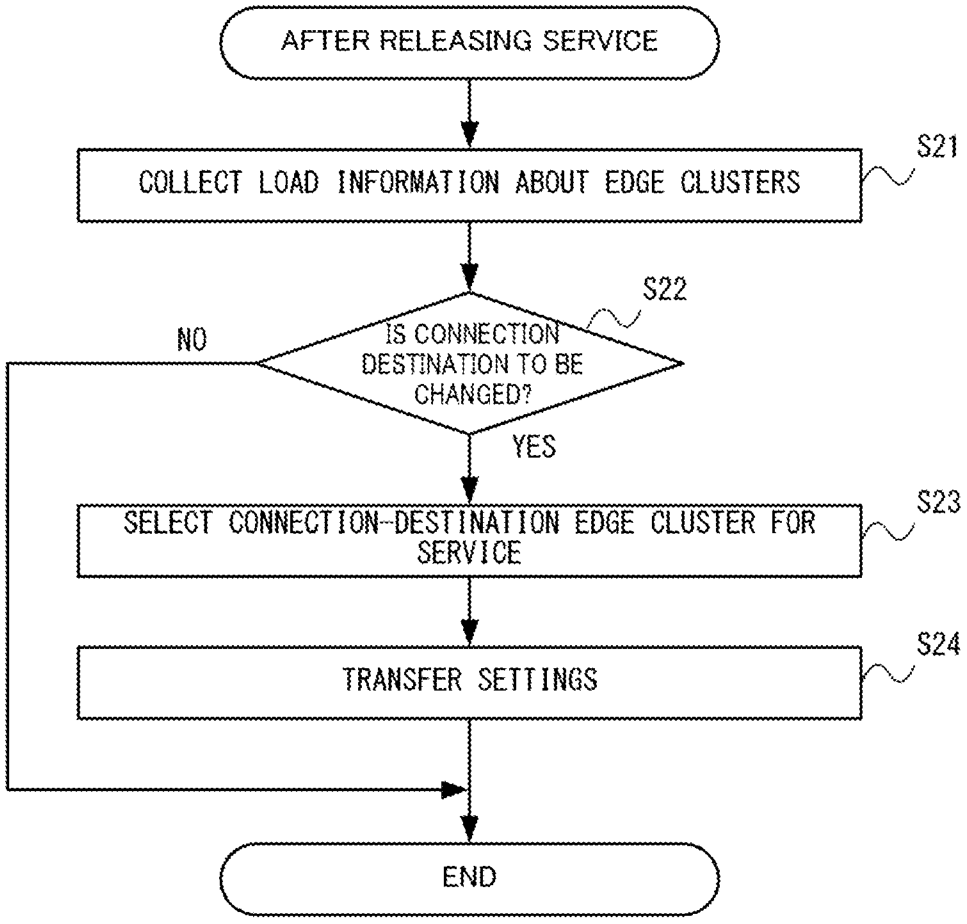
FIG. 7 is a flowchart of a process performed by the controller after releasing a service.
Figure 8:
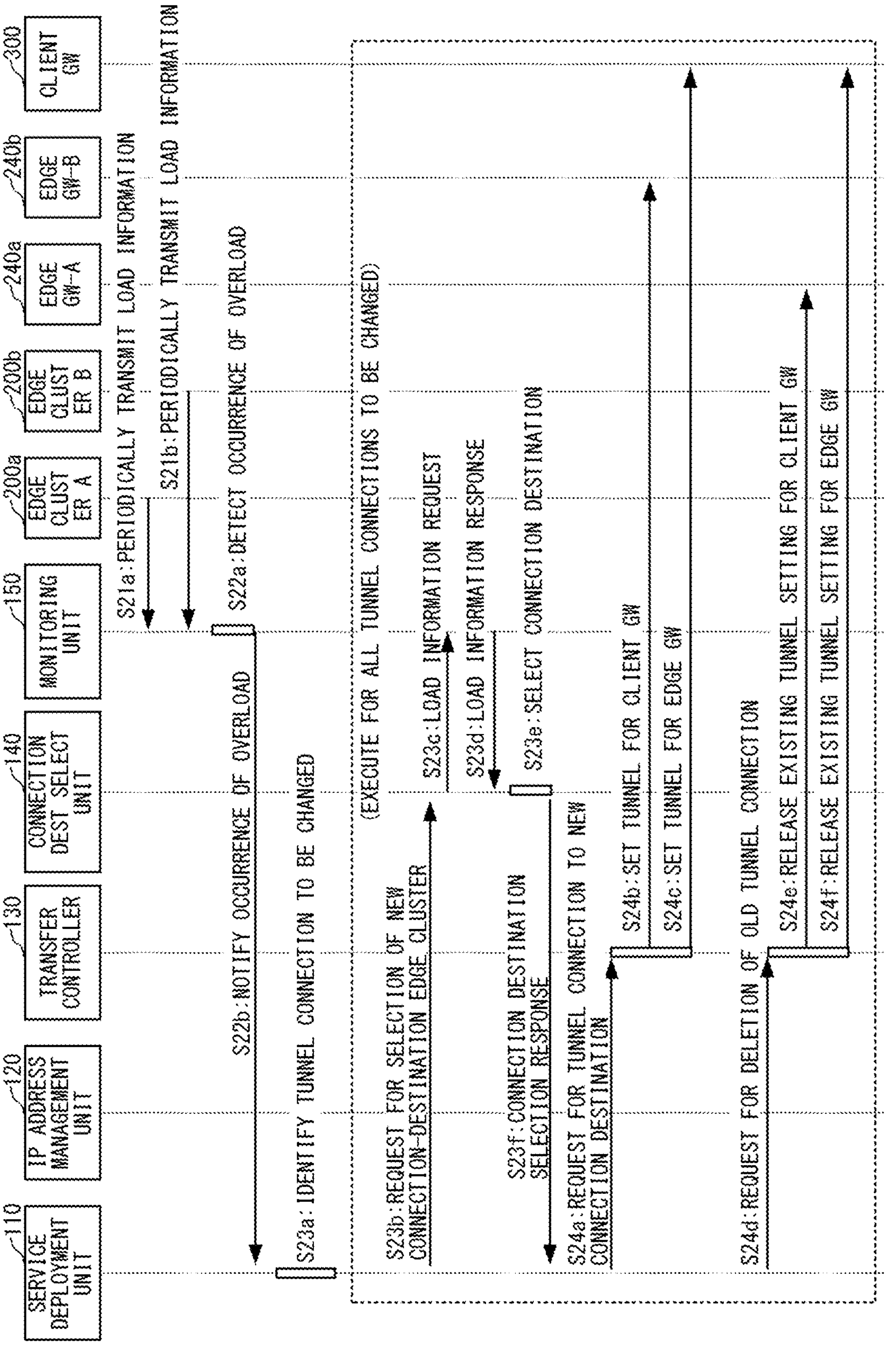
FIG. 8 is a sequence diagram of a process performed after releasing a service in the first embodiment.

Next, a process performed in the system 10 according to the present embodiment after releasing a service will be described below. FIGS. 7 and 8 are a flowchart and a sequence diagram, each of which illustrates a flow of the process after releasing a service. The sequence diagram of FIG. 8 illustrates a flow of a process at the time of, when overload occurs in the edge cluster 200*a* in a situation in which access to the service A (the cluster IP) is transferred to the edge cluster 200*a*, changing settings so as to transfer the access to the edge cluster 200*b*. Process numbers of FIG. 7 correspond to process numbers of FIG. 8. In FIG. 8, subscripts such as a and b are attached to process numbers of processes corresponding to FIG. 7 in order to indicate that the processes are elements of the processes illustrated in FIG. 7.

At step S21, the controller 100 continually collects load information about the edge clusters. Collection of load information may be, for example, periodically performed. Specifically, in the load information collection process, each of the edge clusters 200*a* and 200*b* periodically notifies the monitoring unit 150 of load information, that is, information about a load or vacant resources at steps 21*a* and 21*b*. The notification may be voluntarily performed by each edge cluster 200 or may be performed as a response to an inquiry from the monitoring unit 150.

At step S22, the controller 100 judges whether or not necessity of changing the connection destination has occurred in the currently set tunnel connection. More specifically, the process of step S22 includes the following process. At step S22*a*, the monitoring unit 150 detects occurrence of overload in any of the edge clusters. It can be judged that overload has occurred, if the load of any of the edge cluster becomes equal to or above a threshold, or the number of vacant resources becomes below a threshold. At step 22*b*, when occurrence of overload is detected, the monitoring unit 150 notifies the service deployment unit 110 of an overload occurrence notification indicating in which edge cluster the overload has occurred.

At step S23, the controller 100 selects a new connection-destination edge cluster for tunnel connection that requires change of the connection destination. More specifically, the process of step S23 includes the following process. At step S23*a*, the service deployment unit 110 identifies the tunnel connection that requires change of the connection destination by referring to the connection management table 60 (FIG. 6). For example, when overload has occurred in the edge cluster 200*a*, the service deployment unit 110 judges that tunnel connection for which the edge gateway 240*a* of the edge cluster 200*a* is selected in the connection management table 60, as tunnel connection that requires change of the connection destination. At step S23*b*, the service deployment unit 110 notifies the connection destination selection unit 140 of a connection destination edge selection request including a target client gateway and a target cluster IP. The target client gateway can be acquired from the connection management table 60, and the target cluster IP can be acquired from the address management table 50 (FIG. 5). At step S23*c*, the connection destination selection unit 140 request load information from the monitoring unit 150; and, at step S23*d*, the monitoring unit 150 notifies the connection destination selection unit 140 of load information about each edge cluster. At step S23*e*, the connection destination selection unit 140 selects a new connection-destination edge cluster based on the load information. A selection method may be similar to that at the time of releasing a service, but it is not necessarily required to adopt the same reference. At step S23*f*, the connection destination selection unit 140 notifies the service deployment unit 110 of a connection destination selection response including the selected edge cluster.

At step S24, the controller 100 makes settings so that access to the service is transferred from the target client gateway to the edge gateway of the newly selected edge cluster. In the present embodiment, the controller 100 sets tunnel connection between the gateways. More specifically, the process of step S24 includes the following process. At step S24*a*, the service deployment unit 110 notifies the transfer controller 130 of a tunnel connection request including the gateway of the newly selected edge cluster, the target client gateway, and the cluster IP. At steps S24*b* and S24*c*, the transfer controller 130 makes a notification to each of the newly selected edge gateway and target client gateway to cause the gateways to make settings for tunnel connection. Further, at step S24*d*, the service deployment unit 110 notifies the transfer controller 130 of a tunnel connection deletion request including the old edge gateway, the target client gateway, and the cluster IP. At steps S24*e* and S24*f*, the transfer controller 130 makes a notification to each of the old edge gateway and the target client gateway to cause the gateways to delete tunnel connection. By the above processes, the old tunnel connection is deleted; the new tunnel connection is set; and access using the service name (the cluster IP) from the client terminals 400 is transferred to the newly selected edge gateway and, furthermore, to the edge system.

The processes after step S23*a* described above are executed for all existing tunnel connections judged to require change.

Advantageous Effects of the Present Embodiment

According to the present embodiment, when a new service is released, the same cluster IP (an IP address) is assigned to the service in all edge clusters. Therefore, by setting appropriate tunnel connection between gateways, it is possible to transfer access from a client terminal using a service name or a cluster IP, to a desired edge cluster. Further, since the process for settings for transfer is simple, it becomes possible to frequently release a new service.

Further, since selection of a connection destination is executed each time a service is released (generated, updated, and deleted), and monitoring of occurrence of overload is periodically performed after the service is released, it is possible to quickly change settings for transfer at an appropriate timing, and always realize appropriate settings for transfer. Even if overload occurs due to access concentration on a certain edge system, the access transfer destination can be quickly switched. Therefore, it is possible to reduce the possibility of performance deterioration and service stop of the edge system.

Second Embodiment

In the first embodiment, access to a particular service (a cluster IP) from a client terminal 400 is transferred to a connection-destination edge cluster 200 using tunnel connection. In the present embodiment, access to a particular service (a cluster IP) from a client terminal 400 is transferred to a connection-destination edge cluster 200 by routing settings for an IP network.

Since the basic configuration of a system according to the present embodiment is similar to that of the first embodiment (FIG. 1), description thereof will be omitted.

Figure 9:
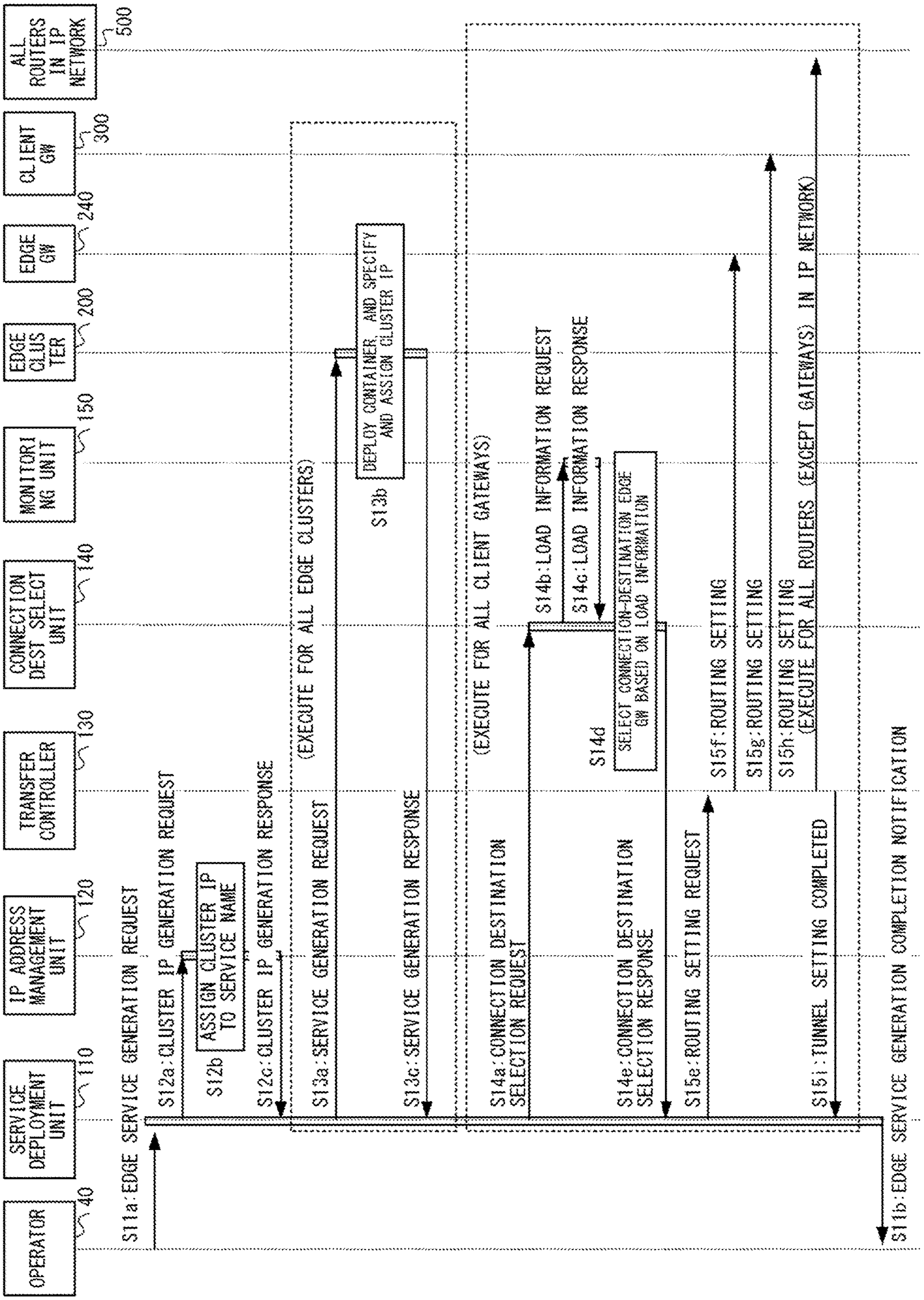
FIG. 9 is a sequence diagram of a process performed at the time of releasing a service in a second embodiment.

A process performed at the time of releasing a service in the present embodiment is basically similar to that of the first embodiment (FIG. 3). Details of step S15, however, are different. FIG. 9 is a sequence diagram of a process performed at the time of releasing a service in the present embodiment.

Since operation from steps S11 to S14 is similar to that of the first embodiment, description thereof will be omitted. At step S15 in the present embodiment, the controller 100 sets each router in an IP network so that an IP packet the destination IP address of which is a cluster IP is routed to the edge gateway 240 of an edge cluster 200 selected at step S14*d*, the IP packet being transmitted from a client gateway 300 connected to by a client terminal 400. More specifically, the process of step S15 includes the following process. At step S15*e*, the service deployment unit 110 notifies the transfer controller 130 of a routing setting request including all routers in the IP network and the cluster IP of a service for which settings are to be made. At step S15*f*, the transfer controller 130 notifies the selected edge gateway of the target client gateway and the cluster IP, and makes settings so that communication using the cluster IP is transferred to the target client gateway. At step S15*g*, the transfer controller 130 notifies the target client gateway of the selected edge gateway and the cluster IP, and makes settings so that communication using the cluster IP is transferred to the selected edge gateway. At step S15*h*, the transfer controller 130 makes settings for all the routers 500 (except gateways) in the IP network so that communication from the target client gateway using the cluster IP is transferred between the client gateway and the selected edge gateway. Settings for routing in the IP network have been completed as described above, and the access from the client terminal using the cluster IP is transferred to the selected edge cluster.

Figure 10:
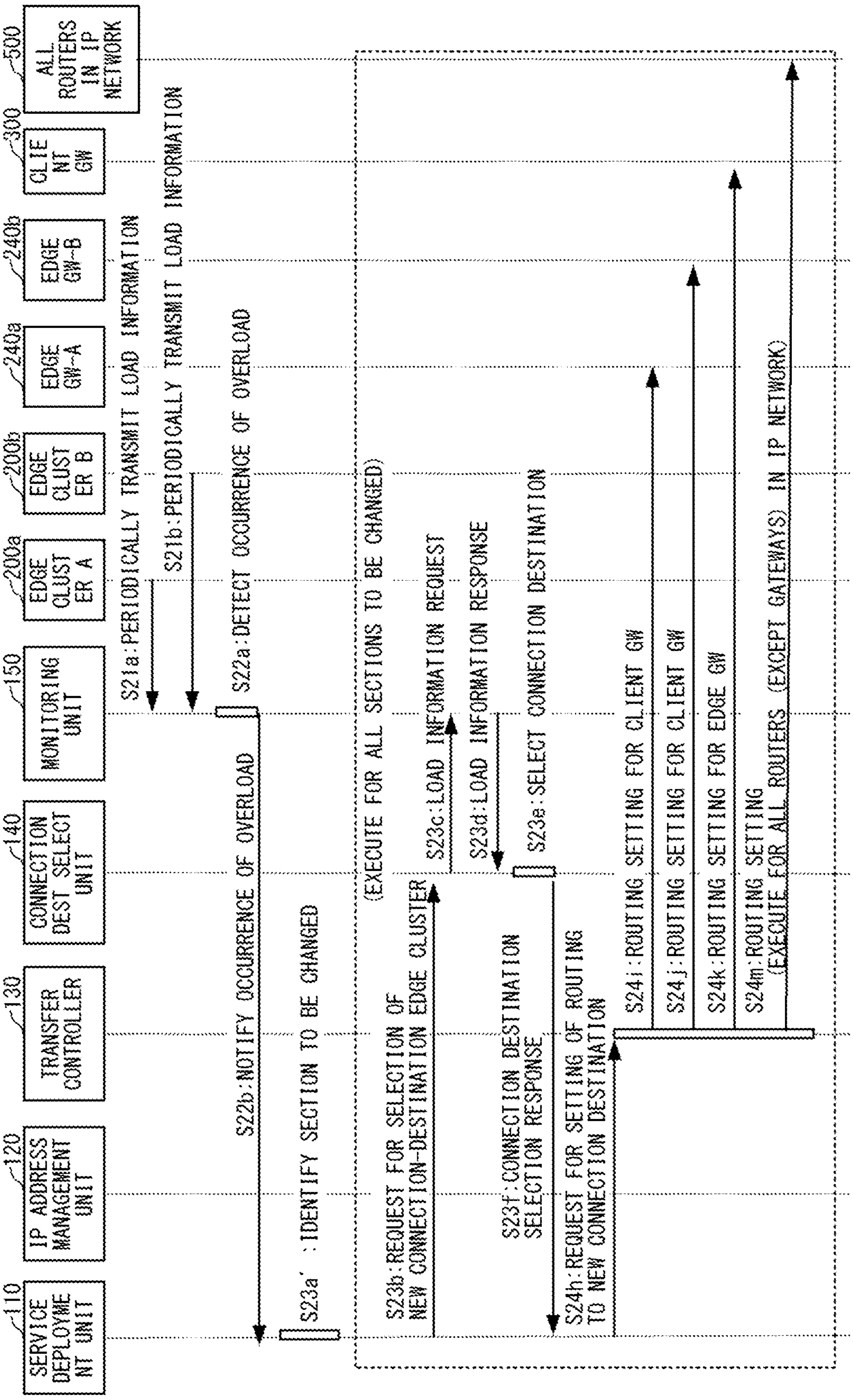
FIG. 10 is a sequence diagram of a process performed after releasing a service in the second embodiment.

A process performed after releasing a service in the present embodiment is basically similar to that of the first embodiment (FIG. 7). Details of step S24, however, are different. FIG. 10 is a sequence diagram of a process performed after releasing a service in the present embodiment. The sequence diagram of FIG. 10 illustrates a flow of a process when overload has occurred in the edge cluster 200*a*.

Since operation from steps S21 to S23 is basically similar to that of the first embodiment, description thereof will be omitted. The operation, however, is different in that, at step S23*a*', the service deployment unit 110 identifies a network section that requires change in routing settings instead of identifying tunnel connection that requires change in transfer settings.

At step S24 in the present embodiment, the controller 100 changes settings for the routers in the IP network so that access from the client gateway 300*a* connecting to a service on an edge cluster where overload has been detected is connected to a service on another edge cluster gateway where overload has not occurred. More specifically, the process of step S24 includes the following process. At steps S24*i*, S24*j*, S24*k*, and S24*m*, the transfer controller 130 makes settings for the edge gateway 240*a*, the edge gateway 240*b*, the client gateway 300*a*, and all the routers 500 (except gateways) in the IP network so that communication using the cluster IP from the target client gateway 300*a* is transferred between the client gateway 300*a* and the selected edge gateway 240*b*.

By changing routing settings in an IP network like the present embodiment, access using a cluster IP can be transferred to a desired edge cluster, and it is possible to obtain effects similar to those of the first embodiment.

Other Modifications

The above embodiments are mere examples, and the present disclosure can be practiced by being appropriately changed within a range not departing from the spirit thereof.

The processes and means described in the present disclosure can be freely combined and implemented as far as a technical contradiction does not occur.

A process described as being performed by one device may be shared and executed by a plurality of devices. Further, a process described as being performed by different devices may be executed by one device. In a computer system, which hardware configuration (server configuration) each function is realized in is flexibly changeable.

The present disclosure can be realized by supplying a computer program implemented with the functions described in the above embodiments to a computer, and one or more processors of the computer reading and executing the program. Such a computer program may be provided for the computer by a non-transitory computer-readable storage medium that is connectable to the system bus of the computer or may be provided for the computer via a network. As the non-transitory computer-readable storage medium, for example, any type of disk such as a magnetic disk (a floppy (registered trademark) disk, a hard disk drive (HDD), or the like) and an optical disc (a CD-ROM, a DVD disc, a Blu-ray disc, or the like), a read-only memory (ROM), a random-access memory (RAM), an EPROM, an EEPROM, a magnetic card, a flash memory, an optical card, and any type of medium that is appropriate for storing electronic commands are included.

What is claimed is:

1. A computer system comprising:

a plurality of edge systems, each of the plurality of edge systems comprising at least one first processor and at least one first memory and being configured to receive a program of a service and an IP address, start the service by executing the program, and associate the received IP address to the service; and a control apparatus comprising at least one second processor and at least one second memory storing a second program which, when executed by the at least one second processor, causes the at least one second processor to:

manage IP addresses of services provided by the plurality of edge systems;

assign, when receiving a first service generation request including a service name and a program corresponding to a service having the service name, an IP address to the service, wherein a same IP address is assigned to services having same service names;

send, to each of the plurality of the edge systems, a second service generation request including the service name, the program, and the assigned IP address, the second service generation request causing a respective edge system of the plurality of edge systems to start the service and associate the IP address with the service;

select, for each of a plurality of client-side gateways, an edge system to which an access request to the service having the service name, which is transmitted from a client terminal and received by the client-side gateway, is routed; and control, for each client-side gateway, a respective client-side gateway and an edge-side gateway associated with the selected edge system, such that the client terminal is able to access the service having the service name provided by the selected edge system.

2. The computer system according to claim 1, wherein the second program, when executed by the at least one second processor, causes the at least one second processor to set tunnel connection between the client-side gateway connected to the client terminal and the edge-side gateway connected to the selected edge system.

3. The computer system according to claim 1, wherein the second program, when executed by the at least one second processor, causes the at least one second processor to:

monitor loads or vacant resources of the plurality of edge systems; and select the edge system to which the client terminal is to be connected, based on the loads or vacant resources of the plurality of edge systems.

4. The computer system according to claim 3, wherein the second program, when executed by the at least one second processor, causes the at least one second processor to preferentially select an edge system with a lower load or with more vacant resources.

5. The computer system according to claim 3, wherein the second program, when executed by the at least one second processor, causes the at least one second processor to:

continually monitor the loads or vacant resources of the plurality of edge systems; and select the edge system to which the client terminal is to be connected and control the client-side gateway based on a result of the monitoring.

6. The computer system according to claim 3, wherein the second program, when executed by the at least one second processor, causes the at least one second processor to:

monitor the loads or vacant resources of the plurality of edge systems each time a service is released; and select the edge system to which the client terminal is to be connected and control the client-side gateway based on a result of the monitoring.

7. The computer system according to claim 1, wherein each of the plurality of edge systems is a cluster system configured of a plurality of computers and providing the service by executing a containerized application.

8. A control apparatus in a computer system, the computer system comprising a plurality of edge systems, a plurality of edge-side gateways, and a plurality of client-side gateways, and the control apparatus comprising:

at least one processor; and at least one memory storing a program which, when executed by the at least one processor, causes the at least one processor to:

select, for each client-side gateway, an edge system to which an access request for a service, which is transmitted from a client terminal and received by the client-side gateway, is routed; and control, for each client-side gateway, a respective client-side gateway and an edge-side gateway associated with the selected edge system, such that the client terminal is able to communicate with the selected edge system when accessing the service.

9. The control apparatus according to claim 8, wherein the program, when executed by the at least one processor, causes the at least one processor to set tunnel connection between the client-side gateway connected to the client terminal and the edge-side gateway connected to the selected edge system.

10. The control apparatus according to claim 9, wherein the program, when executed by the at least one processor, causes the at least one processor to:

monitor loads or vacant resources of the plurality of edge systems; and preferentially select an edge system with a lower load or with more vacant resources.

11. The control apparatus according to claim 10, wherein the program, when executed by the at least one processor, causes the at least one processor to:

continually monitor the loads or vacant resources of the plurality of edge systems; and perform the selecting the edge system and the controlling the respective client-side gateway and the edge-side gateway based on a result of the continual monitoring.

12. The control apparatus according to claim 10, wherein the program, when executed by the at least one processor, causes the at least one processor to:

monitor the loads or vacant resources of the plurality of edge systems each time at least one common service provided by the plurality of edge systems is updated; and perform the selecting the edge system and the controlling the respective client-side gateway and the edge-side gateway based on a result of the monitoring.

13. A control method comprising:

assigning an IP address to a service provided by each of a plurality of edge systems, wherein a same IP address is assigned to services having same service names;

sending, to each of the plurality of the edge systems, a service generation request including a service name, a program, and the assigned IP address, the service generation request causing a respective edge system of the plurality of edge systems to start the service and associate the IP address with the service;

selecting, for each of a plurality of client-side gateways, an edge system to which an access request to the service having the service name, which is transmitted from a client terminal and received by the client-side gateway, is routed; and controlling, for each client-side gateway, a respective client-side gateway and an edge-side gateway associated with the selected edge system, such that the client terminal is able to access the service having the service name provided by the selected edge system.

14. The control method according to claim 13, wherein tunnel connection is set between the client-side gateway connected to the client terminal and the edge-side gateway connected to the selected edge system.

15. The control method according to claim 13, further comprising monitoring loads or vacant resources of the plurality of edge systems continually or each time a service is released to the plurality of edge systems; wherein an edge system with a lower load or with more vacant resources is preferentially selected.

16. The control method according to claim 13, wherein the plurality of edge systems are notified of the service and the IP address assigned to the service, and control is performed such that deployment of the service and assignment of the IP address to the service are performed in the plurality of edge systems.

17. A control method for performing control in a computer system, the computer system comprising a plurality of edge systems, a plurality of edge-side gateways, and a plurality of client-side gateways, the method comprising:

managing IP addresses of services provided by the plurality of edge systems, wherein a same IP address is assigned to services having same service names;

selecting, for each client-side gateway, an edge system to which an access request for the service, which is transmitted from a client terminal and received by the client-side gateway, is routed; and controlling, for each client-side gateway, a respective client-side gateway and an edge-side gateway associated with the selected edge system, such that the client terminal is able to communicate with the selected edge system when accessing the service.

18. The control method according to claim 17, wherein tunnel connection is set between the client-side gateway connected to the client terminal and the edge-side gateway connected to the selected edge system.

19. A non-transitory computer-readable medium storing a program, wherein the program causes a computer to execute the control method according to claim 13.

20. The computer system according to claim 1, wherein the second program, when executed by the at least one second processor, causes the at least one second processor to control, for each client-side gateway, a respective client-side gateway and a corresponding one of a plurality of edge-side gateways associated with the edge system selected for the respective client-side gateway, such that the client terminal is able to communicate with the selected edge system when accessing of the service.

* * * * *